Dec. 15, 1959 J. H. POWERS 2,917,130
ELECTROSTATIC GAS FILTER HAVING ARRANGEMENT
FOR CANCELLING CAPTURED CHARGE
Filed Dec. 11, 1957 2 Sheets-Sheet 1

INVENTOR.
JAMES H. POWERS
BY
HIS ATTORNEY

INVENTOR.
JAMES H. POWERS
BY
HIS ATTORNEY

United States Patent Office 2,917,130
Patented Dec. 15, 1959

2,917,130

ELECTROSTATIC GAS FILTER HAVING ARRANGEMENT FOR CANCELLING CAPTURED CHARGE

James H. Powers, Middletown, Ky., assignor to General Electric Company, a corporation of New York Application December 11, 1957, Serial No. 702,052

3 Claims. (Cl. 183—7)

The present invention relates to an electrostatic gas filter of the type in which an electrostatic field is created in a dielectric filter medium arranged across a gas stream and more particularly to an arrangement for cancelling the effect on the filtering efficiency of the filter medium due to the captured charge accumulating thereon from the naturally charged particles trapped on the filter medium.

In an electrostatic filter of the type illustrated in my copending application S.N. 534,250, filed September 14, 1955, now Patent No. 2,814,355, assigned to the General Electric Company the assignee of the present application, the adjacent pleats of an accordion folded filter medium disposed across the path of a gas stream have electrostatic charges of opposite polarities or of different magnitudes induced thereon. A plurality of parallel electrodes, on the downstream side of the filter medium and disposed closely adjacent each of the upstream ridges thereof, are connected to sources of electrical potential and induce electrostatic charges of opposite polarity or of different magnitudes upon adjacent pleats of the filter medium. Alternate electrodes are connected to a source of high D.C. electrical potential and the intermediate electrodes are connected to ground potential. The electrodes create an electrical field, the maximum intensity of which is in the plane of the electrodes or approximately in the plane of the upstream ridges of the filter medium.

A particle carried by the air stream into the electrical field between adjacent pleats of such a filter medium becomes electrostatically charged and is thereupon repelled by one side and attracted to the other side of the filter medium. Upon contact with the side to which it is attracted, the particle takes on the charge of that side and is then repelled by that side and attracted to the opposite side. The charged particle thereby moves back and forth across the area between adjacent pleats until it becomes embedded within the fibers of the filter medium. Thus, the particle is influenced by a force which in effect opposes that of the air stream and which reduces the possibility that the particle may be carried through the filter medium without becoming trapped therein.

In the above type of filter, with the electrodes arranged closely adjacent the upstream ridges of the filter medium, the intensity of the electrical field is greatest in the plane of the electrodes and it is this high intensity field which induces the charge upon the particles entering therein and which provides the force influencing the particles after they contact the filter medium. Under normal conditions the atmosphere contains a great number of particles that have already picked up an electrical charge through cosmic rays, X-rays, electrical disturbances, etc. When these naturally charged particles enter the electrical field of the filter they are, depending upon whether they are positively or negatively charged, attracted to the areas of the filter medium adjacent either the high voltage electrodes or the grounded electrodes. Under low humidity conditions, when the leakage resistance of the dielectric filter medium is very great, these naturally charged particles gradually build up an accumulative charge in the areas adjacent the electrodes. This accumulative charge is of opposite polarity from the charge on the electrodes since these naturally charged particles entrapped on the filter medium close to these electrodes always have a charge opposite the charge of the particular electrode. The accumulative or captured charge adjacent the electrodes sets up its own field which is in opposition to the electrical field produced by the electrodes and, after a period of time, reduces the tendency of the electrical field of the electrodes to repel or attract particles entering therein thereby reducing the efficiency of the filter.

Accordingly, it is an object of the present invention to provide an improved electrostatic filter in which the detrimental effect of this captured charge is substantially eliminated.

It is a further object of the present invention to provide an improved electrostatic filter in which the electrical field produced by the captured charge on the filter medium is used to aid in the capture of particles entering the filter.

Further objects and advantages of the invention will become apparent as the following description proceeds, and the features of novelty which characterize the invention will be pointed out with particularity in the claims annexed to and forming a part of this specification.

In accordance with the present invention, there is provided an electrostatic filter for filtering particles from a gas stream comprising an accordion folded filter medium of dielectric fibrous material disposed across the path of a gas stream and having a plurality of electrodes arranged on the downstream side of a filter medium with each of the electrodes closely adjacent the upstream facing ridge of the respective pleat encompassing it. The electrodes within upstream facing pleats are divided into two groups with the electrodes of the first group arranged alternately between the electrodes of the second group. The electrodes of the first group are connected to a source of voltage of one polarity and the electrodes of the second group are connected to a source of voltage of opposite polarity thereby creating between the adjacent electrodes an electrostatic field having its maximum intensity approximately in the plane of the upstream ridges of the filter medium. Means are provided for periodically reversing the connections of the first and second groups of electrodes to their respective sources of voltage thereby reversing the polarity of the electrostatic field produced between the adjacent electrodes, whereby the captured charge in the areas of the filter adjacent the electrodes is effectively reduced by subsequently captured, charged particles of opposite polarity which become entrapped in these particular areas due to the reversed polarity of the electrostatic field.

For a better understanding of the invention, reference may be had to the accompanying drawings in which.

Figure 1:
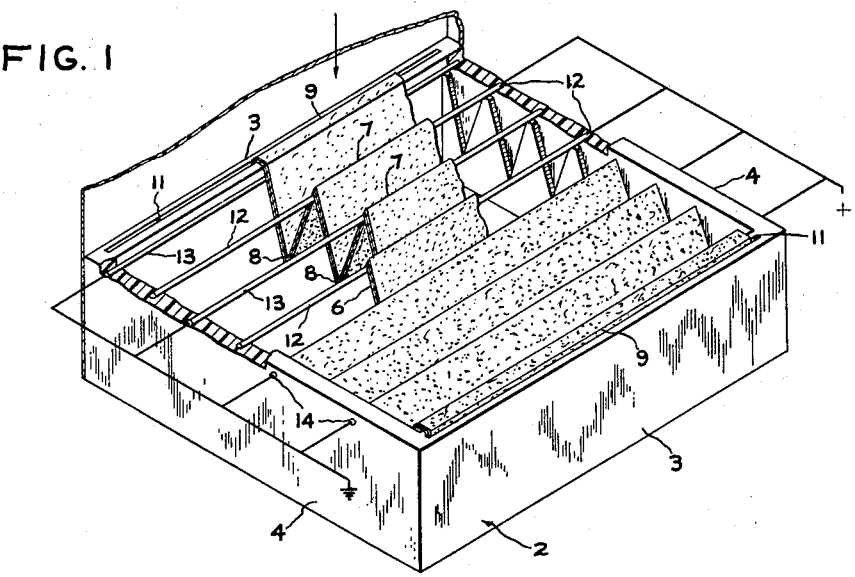
Fig. 1 is an orthographic view of an electrostatic filter to which the present invention is particularly well adapted.

In Fig. 1 of the drawing there is shown an electrostatic gas filter comprising an insulating frame member 2 having ends 3 and opposed side walls 4. The side walls 4 support the ends of a plurality of electrodes arranged in coplanar parallel spaced relationship across the frame member. A dielectric filter medium 6 comprising one or more sheets of fibrous material folded into an accordion or zig-zag fold having alternately facing upstream and downstream ridges 7 and 8, respectively, is at least partially supported by the electrodes and is arranged to fill the internal area within the frame member 2. The ends 9 of the filter sheet are anchored by insertion into the suitable slots 11 in the ends 3 of the frame member. In Fig. 1, it can be seen that the filter medium entirely overlies the electrodes, each of which is disposed adjacent an upstream facing ridge 7 of the filter medium. As may be seen by the arrows in Fig. 1, which represent the direction of air flow through the filter, the electrodes are on the downstream side of the filter medium 6 during the operation of the filter.

The electrode arrangement comprises a first series of electrodes 12 and a second series or group of electrodes 13 which, in the operation of the filter, are maintained at different potentials or opposite polarities. For example, one group or series of electrodes, such as electrodes 12, are charged with a high voltage while the other group 13 is grounded or at a voltage of opposite polarity from that of the first group. By this arrangement in which adjacent electrodes are charged to different electrical potentials, an electrical field is created between adjacent electrodes which has its highest intensity in the plane of the electrodes or approximately in the plane of the upstream facing ridges 7 of the filter medium 6. The pleats enclosing the electrode members and referred to in the specification and claims as "the upstream facing pleats" comprise the upstream facing ridges 7 and those portions or sides of the filter medium connecting thereto and diverging in the downstream direction. Thus, an "upstream facing pleat" includes all of the filter medium between adjacent downstream ridges 8. For example, in Fig. 2 an "upstream facing pleat" is all of the filter material between the downstream facing ridges 8 encompassing the electrode 12.

Because of the electrical field established between adjacent electrodes, each pleat of the filter medium 6 has an electrostatic charge induced thereon. The polarity of the charge induced upon the pleat is the same as that of the electrode encompassed therein and the magnitude of the charge depends upon the distance of the particular portion of the pleat from the electrode. Thus in the filter of the illustrated embodiment the electrostatic charge on the filter medium is of highest intensity in those portions of the filter adjacent the upstream ridges of the filter medium or adjacent the plane of the electrodes since these portions of the filter medium lie the closest to the electrodes. As can be seen in Fig. 1, all of the upstream facing pleats 7 which encompass the first group of electrodes 12 have a high electrostatic potential induced thereon. All of the upstream facing pleats 7 which encompass the second group of electrodes 13 are at a negative or ground potential.

Figure 2:
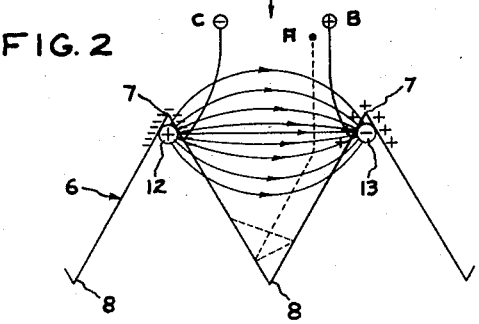
Fig. 2 is a schematic view showing a portion of the dielectric filter of Fig. 1 arranged over the adjacent electrodes of opposite polarities.

As pointed out in my aforementioned copending application, the operation of an electrostatic filter of this type in removing particles from a gas stream may best be understood by reference to Fig. 2 which shows an enlarged cross section of a portion of an electrostatic filter. The electrical field is conveniently illustrated in Fig. 2 by the lines of force or flux lines which are shown to emanate at the positive electrode and end at the negative electrode. It is the applicant's belief that a suspended uncharged particle, such as particle A of Fig. 2, when brought into the high intensity field between adjacent folds of the filter medium, either becomes ionized to take on an electrical charge as it enters the high intensity portion of the field or at least becomes charged when it touches any portion of the filter. The induced charge causes the particle to be attracted to a point within the filter of opposite potential or charge. Thus, particle A moving into the filter at a point adjacent the low potential electrode 13 assumed a charge of similar magnitude and polarity to that of the low potential electrode 13. The charged particle is thereafter deflected away from the low potential electrode 13 towards an area or portion of the filter of opposite polarity or of high electrical potential. The path of the particle A, for example, may follow that generally indicated by the dotted line to a point on the pleat encompassing the high potential electrode 12. At that point the particle will either become enmeshed or anchored in the fibrous structure of the filter medium and permanently held therein or it will immediately take on the same potential as that point on the pleat encompassing the high potential electrode 12 and be attracted to the low potential pleat. If this is the case the particle in its transition from the high potential pleat to the low potential pleat will be under the influence of not only the forward moving gas stream but also the electrical field between the adjacent electrodes 12 and 13. The moving gas stream tends to force the particle downwardly toward the downstream ridge 8 while the electrical field, which is highest in the upstream portions of the filter or portion of the filter adjacent the upstream ridges, tends to attract the particle toward the higher intensity area. As a result the particle moves laterally across and somewhat upstream from the high potential pleat until it contacts the side of the low potential pleat where it assumes the same charge as that point of the low potential pleat. Here, unless the particle is captured and permanently held within the fibrous structure of the filter medium, the process is repeated.

In the applicant's opinion, the above-described operation is the manner in which uncharged particles are collected from the air stream. There are, however, a great number of particles in the atmosphere which are already charged with an electrical potential due to cosmic rays, electrical disturbances, etc., and these particles, as they enter the electrical field, are impelled one way or the other by the electrical field depending on the polarity of the particular charge of the particle. Once they contact the filter, they behave in the same way as uncharged particles and are captured in the manner above described for unchanged particles.

Figure 3:
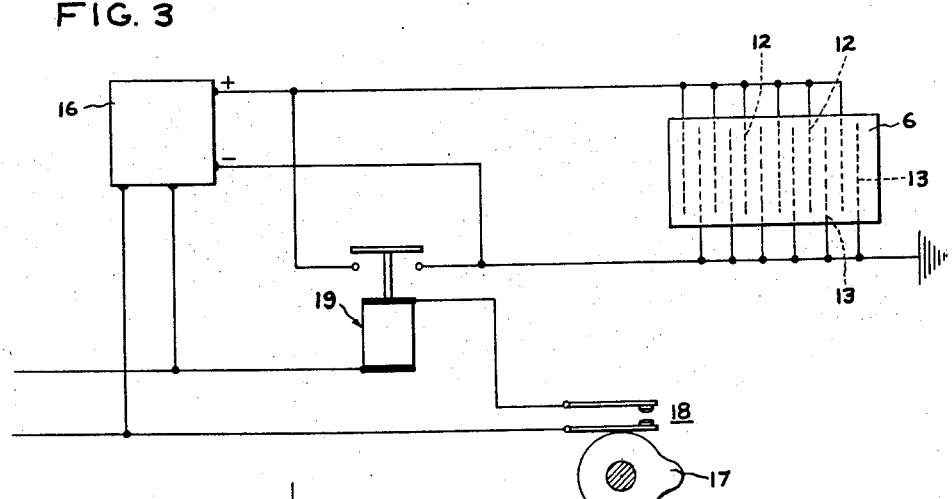
Fig. 3 is a schematic drawing of an electrostatic filter having an arrangement for periodically grounding the high voltage electrodes of the filter.

The above theory of operation explains the type of effective filtering operation which usually occurs under somewhat humid conditions. These are the conditions normally encountered when the filter is used in an air conditioning device, such as a room air conditioner used for cooling an enclosure. In a somewhat humid atmosphere there is a certain amount of leakage through the dielectric filter medium and this leakage makes it possible for a particle coming into contact with the pleats of a filter medium to lose its original charge and to assume the charge of that portion of the filter medium. However, under conditions of low humidity such as are encountered in the winter when this type of filter is used in combination with air heating equipment it has been found that the efficiency of the above described electrostatic filter rapidly deteriorates within a few minutes after the operation is started. This, in the applicant's opinion is due to the effect of the accumulating natural charge which collects on the filter medium adjacent the upstream facing ridges thereof under low humidity conditions. For example, referring to Fig. 2, the naturally charged particle, such as the positively charged particle B, as it approaches the filter is attracted toward the low potential pleat of the filter medium and will normally contact the filter medium at some point in the upstream portion of the filter and more than probably very closely adjacent the upstream ridges 7 thereof. Because these particles already have a charge before entering the field, they are always subjected to the influence of the high intensity portion of the field and will generally contact the filter medium at some point close to the high intensity plane of the field. If the particle B becomes trapped in the fibrous structure of the filter medium at this point, it provides a minute charge in that particular area of the filter which is of opposite polarity from that of the electrode 13. A particle C, which is negatively charged, could become similarly entrapped in the area adjacent the high potential electrode 12, as indicated by its dotted line path in Fig. 2. If these charges cannot leak off, which is normally the situation under low humidity conditions, they will accumulate until the cumulative charge cancels the effect of the electrical field produced by the electrodes 12 and 13. It has been found by experimentation that, during low humidity conditions, the above described type of filter, when filtering air which contains about 40% charged particles (a percentage not unusual to ordinary household air), will start out filtering fairly well but within two or three minutes its efficiency is greatly reduced. Regardless of the cause of the above described reduction in efficiency of the filter, it has been found that the efficiency can be maintained at a uniform high level if the current to the high voltage electrodes is interrupted for short periods of time at periodical intervals and these electrodes are connected during this interruption to ground. Referring to Fig. 3 there is shown, in schematic form, a means whereby the above mentioned periodical interruptions are accomplished. As may be seen in Fig. 3, means are provided for connecting the first group of electrodes 12 to the high potential side of a power pack 16 and for periodically connecting these electrodes to a source of ground potential. The power pack 16 may be any of the many types of power pack arrangements now on the market for converting a low voltage alternating current to a high voltage, low amperage direct current. The second group of electrodes 13 are connected to ground as is the negative side of the power pack 16. In order to periodically interrupt the current to the electrodes 12, a timer operated cam 17 is provided which is driven by a shaft from a clock motor (not shown) or other rotating mechanism. The cam 17 is geared to make one complete revolution in a predetermined period, for example, two minutes, and during its rotation it operates a normally open switch 18 to the closed position for a certain fraction of the total rotational period. The switch 18, in turn, energizes a solenoid operated switch 19 which connects the high voltage supply lines from the power pack 16 to ground and at the same time grounds the first group of electrodes 12.

Figure 4:
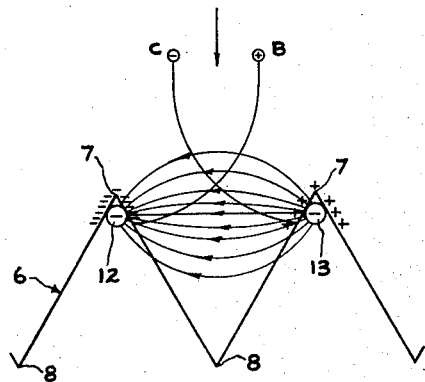
Fig. 4 is a schematic view of the filter of Fig. 2 with the high voltage electrode at ground potential.

The effect of this grounding can best be understood by reference to Fig. 4. If both of the electrodes 12 and 13 are grounded the electrical field produced between these electrodes is eliminated and the electrical field produced by the accumulated charge in the areas adjacent the upstream portions of the filter 6, or the upstream ridges 7 of the filter, is the only electrical field present. The electrical field produced by this accumulating charge is illustrated by the lines of force in Fig. 4 and is oppositely disposed from that of the electrical field illustrated in Fig. 2. Any naturally charged particles in the air stream which enter the filter area at the time the high voltage electrodes 12 are grounded will be under the influence of the electrical field created by the accumulated captured charge. This field is the reverse of the field produced by the electrodes 12 and 13 and naturally charged particles in the air stream will be impelled by this field to opposite pleats of the filter medium than would ordinarily be the case. Referring to Fig. 4, positively charged particle B is now attracted to the pleat encompassing the grounded electrode 12 whereas previously the positively charged particles had been attracted to the pleat encompassing the electrode 13. The effect of these charged particles being attracted to the opposite pleats of the filter medium causes the captured charge on these pleats to become rapidly dissipated or cancelled by the now accumulating opposite charge. When the cam 17 has traversed far enough to permit the contacts of the normally open switch 18 to open and de-energize the solenoid operated switch 19 thereby completing the high voltage circuit to the electrodes 12, the opposing field of the captured charge will be reduced to a negligible amount.

Because of the extremely low amperage in the high voltage line from the power pack it can be continuously grounded without damage to either the power pack or the relay contacts. It has been found that a cam 17 which rotates at approximately one revolution every two minutes and closes the contacts 18 for two seconds during that revolution is sufficient to effectively eliminate the effect of the collected charge.

Figure 5:
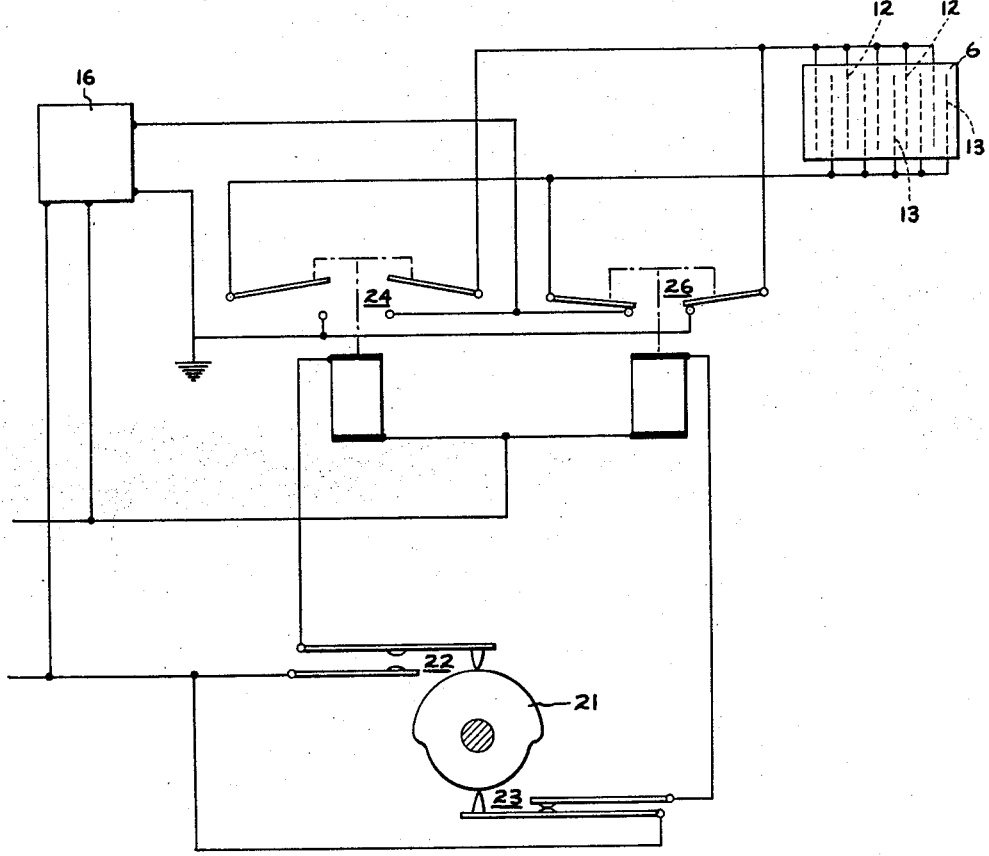
Fig. 5 is a schematic view showing an electrostatic filter having an arrangement whereby the two groups of electrodes are connected to interchanging sources of voltages at periodic intervals.

In a second embodiment of the invention illustrated in Fig. 5, there is provided a means for destroying the detrimental effect of the naturally charged particles which collect on the filter medium by providing for automatic reversing of the high voltage and ground circuits to the filter electrodes at periodical intervals. In other words, the first group of electrodes is connected to a source of high voltage for a predetermined period while the second group of electrodes is connected to ground or to a source of voltage of opposite polarity for the same period. Then, by connecting the second group of electrodes to the source of high voltage for a predetermined period and the first group of electrodes to ground or a source of voltage of opposite polarity for a like period of time, the effect of captured charge is effectively nullified. In order to accomplish this there is provided a cam 21 operated by a suitable driving means such as a clock motor, which operates two normally closed switches 22 and 23. The cam 21 normally makes one revolution in a predetermined period and during this revolution it opens one of the switches, such as the switch 22, for a portion of that period while it closes the other switch 23 and, for the remaining portion of each revolution, it closes switch 22 while it opens the second switch 23. Switches 22 and 23 energize and deenergize solenoid operated switches 24 and 26 respectively to alternately connect the low voltage or ground line to the electrodes 13 while connecting the high voltage power line to the electrodes 12 and then reversing this connection for a predetermined time. Thus, with the switch 22 opened and switch 23 closed the solenoid switch 26 is energized to close its contacts thereby connecting the first group of electrodes 12 to ground and the second group of electrodes 13 to the high voltage supply line from the power pack.

Figure 6:
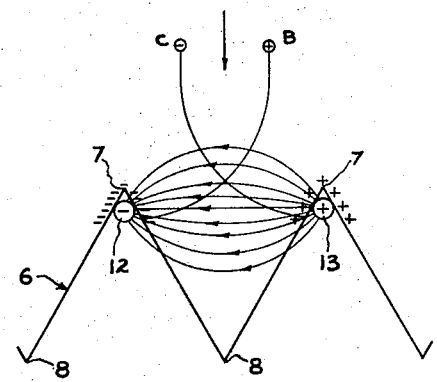
Fig. 6 is a schematic view of the filter of Fig. 2 showing the result of reversing the polarity of the electrodes.

The above reversing operation has the effect on the filter medium which is shown in Fig. 6 and which represents the conditions on the filter medium 6 just after the switch 26 has reversed the polarity of the electrodes making the electrodes 13 the high voltage electrodes and the electrodes 12 the low voltage or ground electrodes. The electrostatic field which is now created by the electrodes 12 and 13 is in the reverse direction to that originally created, as is illustrated in Fig. 2. The accumulated charge, which had previously been collected on the filter medium adjacent the electrodes when the polarity of the field was the reverse from what it is now, is such that it now enhances the present electrical field produced by the electrodes. Positive and negative charges B and C which enter the field are now attracted and repelled under the combined effect of the electrostatic field of the cumulative natural charge and the electrical field created by the electrodes 12 and 13. These charged particles, as they become entrapped in the filter medium 6 immediately begin to reduce or cancel the effect of the captured charge which was created during the previous predetermined period when the polarity of the electrodes 12 and 13 was reversed. After another predetermined period the polarity of electrodes 12 and 13 will again be reversed, via the switch 22 and the solenoid switch 24, and the natural charge which has again accumulated on the filter medium 6 adjacent these electrodes will be cancelled or eliminated in the same manner during that period. It has been found that a cam making one complete revolution every four minutes with half of its rotating time operating one of the switches and half operating the other switch is sufficient to completely eliminate the effect of the accumulated charge and to operate the filter at its maximum efficiency. However, the invention is not limited to these particular predetermined time periods as described and conceivably many variations of these periods will operate exceedingly well under different humidity conditions.

By the present invention there is provided a simple arrangement for cancelling or overcoming the effect of the accumulated natural charge which occurs under certain humidity conditions in an electrostatic filter. Moreover, this arrangement lends itself particularly well to those types of uses for electrostatic filters wherein there is some rotating part provided in the system which can be used to drive the timer cam, such as to the fan of an air conditioner.

While in accordance with the patent statutes there has been described what at present is considered to be the preferred embodiment of the invention, it will be obvious to those skilled in the art that various changes and modifications may be made therein without departing from the invention and it is, therefore, the aim of the appended claims to cover all such changes and modifications as fall within the true spirit and scope of the invention.

What I claim as new and desire to secure by Letters Patent of the United States is:

1. An electrostatic filter for filtering particles from a gas stream comprising an accordion folded filter medium of dielectric fibrous material extending across the path of said gas stream with the ridges thereof alternately facing upstream and downstream, a plurality of coplanar parallel electrodes arranged on the downstream side of said filter medium and closely adjacent thereto with only one of said electrodes positioned within any one of said upstream facing pleats of said filter medium, said electrodes being divided into first and second groups with the electrodes of said first group arranged alternately with said electrodes of said second group, a source of high voltage and a source of voltage of opposite polarity thereto, means for connecting said electrodes of said first group to said source of high voltage and said electrodes of said second group to said source of voltage of opposite polarity to charge said filter medium with an electrostatic field having its maximum intensity in the plane of said electrodes, and switch means operable during normal filtering operation of said filter for interchanging said sources of voltage to said first and second groups of electrodes at predetermined periods of time thereby reversing the polarity of said electrostatic field on said filter medium whereby the effect of the electrical field created by naturally charged particles collecting on said medium adjacent said first and second groups of electrodes which opposes the electrostatic field induced by said electrodes on said filter medium is effectively reduced.

2. An electrostatic filter for filtering particles from a gas stream comprising an accordion folded filter medium of dielectric fibrous material extending across the path of said gas stream with the ridges thereof alternately facing upstream and downstream, a plurality of coplanar parallel electrodes arranged on the downstream side of said filter medium and closely adjacent the upstream ridges thereof, said electrodes being divided into first and second groups with the electrodes of said first group arranged alternately with said electrodes of said second group, means for connecting said second group of electrodes to ground, a power pack for supplying a source of high potential direct current, means for connecting said first group of electrodes to said source of high voltage from said power pack to charge said filter medium with an electrostatic field having its maximum intensity approximately in the plane of said upstream facing ridges, switch means for connecting said source of high potential direct current and said first group of electrodes to ground, and timer operated means for actuating said switch means at predetermined intervals to ground for a short period during normal filtering operation of said filter said high voltage line and said first group of electrodes so that the field created by the natural charge of particles collected on said filter medium is reduced by the charged particles subsequently entering said filter medium during said short period when said voltage source is interrupted.

3. An electrostatic filter for filtering particles from a gas stream comprising an accordion-folded filter medium of dielectric fibrous material extending across the path of said gas stream with the ridges thereof alternately facing upstream and downstream, a plurality of coplanar parallel electrodes arranged on the downstream side of said filter medium and closely adjacent the upstream facing ridges thereof, said electrodes being divided into first and second groups with the electrodes of said first group arranged alternately with said electrodes of said second group, a power pack for supplying a source of high potential direct current, a first switch means for connecting said first group of electrodes to said source of high potential direct current from said power pack and for connecting said second group of electrodes to ground to charge said filter medium with an electrostatic field having its maximum intensity approximately in the plane of said upstream facing ridges, a second switch means for connecting said second group of electrodes to said high potential direct current from said power pack and for connecting said first group of electrodes to ground, and timer operated means for alternately actuating said first switch means or said second switch means for interchanging said sources of voltage to said first and second groups of electrodes at predetermined intervals during normal filtering operation of said filter thereby reversing the polarity of said electrostatic field on said filter medium whereby the effect of the electrical field created by naturally charged particles collecting on said medium adjacent said first and second groups of electrodes which opposes said electrostatic field created by said electrodes on said filter medium is effectively reduced.

References Cited in the file of this patent

UNITED STATES PATENTS

| | | |
|---|---|---|
| 2,351,089 | Abbey | June 13, 1944 |
| 2,490,979 | Palmer | Dec. 13, 1949 |
| 2,814,355 | Powers | Nov. 26, 1957 |

FOREIGN PATENTS

| | | |
|---|---|---|
| 398,724 | Great Britain | Sept. 21, 1933 |